(12) United States Patent
Kai et al.

(10) Patent No.: US 6,170,954 B1
(45) Date of Patent: Jan. 9, 2001

(54) OVERHEAD PROJECTOR OF THE UNDER MIRROR TYPE

(75) Inventors: Mutsuo Kai; Kazuhiro Sukenari, both of Nagoya (JP)

(73) Assignee: Elmo Co., Ltd., Aichi (JP)

( * ) Notice: Under 35 U.S.C. 154(b), the term of this patent shall be extended for 0 days.

(21) Appl. No.: 09/473,526

(22) Filed: Dec. 28, 1999

(30) Foreign Application Priority Data

Feb. 18, 1999 (JP) .............................................. P11-039462
Nov. 2, 1999 (JP) .............................................. P11-311790

(51) Int. Cl.[7] .................................................. G03B 21/14
(52) U.S. Cl. ...................... 353/101; 353/98; 353/DIG. 3; 353/DIG. 6; 353/101
(58) Field of Search ................................. 353/63, 64, 65, 353/66, 100, 101, DIG. 3, DIG. 4, DIG. 6, 119, 98

(56) References Cited

U.S. PATENT DOCUMENTS

| | | | | |
|---|---|---|---|---|
| 3,486,817 | * | 12/1969 | Hubner | 353/64 |
| 4,776,688 | * | 10/1988 | Ushiro et al. | 353/66 |
| 5,382,991 | * | 1/1995 | Rodriguez, Jr. et al. | 353/119 |
| 5,530,496 | * | 6/1996 | Mizukawa et al. | 353/63 |
| 5,741,056 | * | 4/1998 | Liu | 353/56 |

* cited by examiner

Primary Examiner—William Dowling
(74) Attorney, Agent, or Firm—Koda & Androlia

(57) ABSTRACT

An overhead projector of the under mirror type includes a projection head assembly supported on a column so as to be located over a stage on the top of a housing and so as to be pivotable between a standing position and a stowed position. A projection lens is fixed on a lens frame and a reflecting mirror is fixed on a mirror plate. Both the lens frame and the mirror plate are rotatably mounted on a single shaft further mounted on the head body of the projection head assembly so that angles of the lens and the mirror are increased and decreased. The lens frame is rotated by a self-weight of the lens in such a direction that the angle of the lens is decreased, when the projection head assembly assumes the standing position. A link lever interconnects the lens frame and the mirror plate so that the angles of them are adjusted so that the angle of the lens doubles that of the mirror. A mirror locking element locks the mirror at a position where the angle of the mirror is maximum. An angle adjusting knobbed bolt is mounted on the head body so as to be turnable and immovable back and forth. An angle adjusting piece is screwed in the knobbed bolt so as to be unturnable and movable back and forth. The mirror plate has an end departed from the angle adjusting piece when the mirror plate is rotated in such a direction that the angle of the mirror is increased. The end of the mirror plate engages the angle adjusting piece when the mirror frame is rotated in such a direction that the angle of the mirror is decreased.

4 Claims, 11 Drawing Sheets

OVERHEAD PROJECTOR OF THE UNDER MIRROR TYPE

BACKGROUND OF THE INVENTION

1. Field of the invention

This invention relates generally to overhead projectors for projecting images above or behind an operator, and more particularly to an overhead projector of the under mirror type in which a reflecting mirror is disposed on a lower portion of a projection head assembly including a projection lens and the mirror.

2. Description of the prior art

Overhead projectors are roughly classified into an over mirror type and an under mirror type. Overhead projectors of the over mirror type comprise a housing having a stage formed on the top thereof and a projection head assembly including a projection lens and a reflecting mirror. The projection head is supported on a column or mast so as to be disposed over the stage. Light from a light source is caused to pass through a transparency bearing an image to be projected and placed on the stage and then the projection lens. The light is then reflected on the mirror so that the image is focused on a screen. A projection angle is readily adjusted by adjustment of an angle of the mirror in the overhead projectors of the over mirror type. However, the mirror protrudes over the projection head assembly and this reduces an easiness to use the overhead projectors.

On the other hand, in overhead projectors of the under mirror type, light from a light source is caused to pass through a transparency and then to reflect on a reflecting mirror. The light is subsequently caused to pass through a projection lens to be focused on a screen. The mirror is located at a lower side of a foldable projection head assembly in the overhead projectors of the under mirror type. This enhances the easiness to use the overhead projectors. However, angles of both of the mirror and the projection lens need to be adjusted for the purpose of adjustment of the projection angle. Furthermore, these angles need to be adjusted so that the angle of the projection lens doubles the angle of the mirror. This construction requires an interlocking mechanism which interlocks the projection lens and the mirror for adjustment of the angles of them.

Japanese Utility Model Registration No. 3043179 discloses an overhead projector of the under mirror type provided with such an interlocking mechanism as described above. In the disclosed overhead projector, an angle adjusting knobbed bolt is turned so that the angle of the mirror is adjusted. The angle of the projection lens is adjusted by the interlocking mechanism simultaneously with that of the mirror so as to double the angle of the mirror.

In the disclosed overhead projector, however, the knobbed bolt is mounted on the projection head assembly so as to be turnable and movable back and forth. The bolt is moved to protrude from the projection head assembly when the latter is folded in a case where the overhead projector is not in use. As a result, the projection head assembly cannot compactly be folded. Furthermore, the bolt rattles when the overhead projector is carried with the head assembly folded.

SUMMARY OF THE INVENTION

Therefore, an object of the present invention is to provide an overhead projector of the under mirror type in which the projection head assembly can compactly be folded.

Another object of the invention is to provide an overhead projector of the under mirror type in which the projection head assembly can be prevented from rattling while the overhead projector is carried with the head folded.

Further another object of the invention is to provide an overhead projector of the under mirror type in which the projection head assembly and the column supporting the head assembly can compactly be folded.

The present invention provides an overhead projector of the under mirror type comprising a housing including a stage formed on a top thereof so that a transparency bearing an image to be projected is placed on the stage and a projection head assembly including a head body further including a reflecting mirror on which light passing through the transparency on the stage reflects and a projection lens focusing the light incident thereon on a screen, the projection head assembly being supported on a column so as to be located over the stage and so as to be movable between a standing position and a stowed position. A head positioning element positions the projection head assembly at the standing position. A head locking element releasably locks the projection head assembly at the stowed position. The projection lens is fixed on a lens frame and the reflecting mirror is fixed on a mirror plate. Both the lens frame and the mirror plate are rotatably mounted on a single shaft further mounted on the head body of the projection head assembly so that angles of the lens and the mirror are increased and decreased. The lens frame is rotated by a self-weight of the lens in such a direction that the angle of the lens is decreased, when the projection head assembly assumes the standing position. A link lever interconnects the lens frame and the mirror plate so that the angles of the projection lens and the mirror are adjusted so that the angle of the lens doubles the angle of the mirror. A mirror locking element releasably locks the mirror at a position where the angle of the mirror is maximum. An angle adjusting knobbed bolt is mounted on the head body so as to be turnable and immovable back and forth. An angle adjusting piece is screwed on the knobbed bolt so as to be unturnable and movable back and forth. The mirror plate has an end departed from the angle adjusting piece when the mirror plate is rotated in such a direction that the angle of the mirror is increased. The end of the mirror plate engages the angle adjusting piece when the mirror frame is rotated in such a direction that the angle of the mirror is decreased.

According to the above-described construction, the angle adjusting piece is moved back and forth along the knobbed bolt when the knobbed bolt is turned. The mirror plate engaging the adjusting piece is rotated about the shaft such that the angle of the mirror is adjusted. The lens frame connected with the mirror plate by the link lever is simultaneously rotated so that the angle of the projection lens is adjusted so as to double the angle of the mirror.

In order that the projection head assembly may be folded, the projection lens is rotated in such a direction that the angle thereof becomes maximum. Then, the mirror plate interconnected with the lens frame by the link lever is also rotated in such a direction that the angle thereof becomes maximum. The end of the mirror plate then departs from the angle adjusting piece. When the projection lens is further rotated to the position where the angle thereof becomes maximum, the mirror is also rotated to the maximum angle position, where the mirror is locked by the locking element. The projection lens interconnected with the mirror by the link lever is also locked. Then, the projection head assembly is rotated to the stowed position and locked at the stowed position by the head locking element.

Since the knobbed bolt mounted on the head body is turnable and unmovable back and forth, the knobbed bolt is disallowed to move with the mirror or the projection lens when the projection head assembly is folded. Thus, the projection head assembly can compactly be folded since the knobbed bolt does not protrude therefrom.

The head locking element preferably includes a locking pin protruding from an arm fixed to the column, a head locking member slidably fitted with the arm and having on an end face thereof an engagement recess, and a spring urging the head locking member along the arm so that an end face of the head locking member abuts against the locking pin, and wherein the locking pin engages the recess such that the projection head assembly is locked at the stowed position and the locking element is slid against a spring force of the spring so that the locking pin disengages from the recess such that the projection head assembly is released from a locked state.

The mirror locking element preferably includes a mirror locking member mounted on an arm fixed on the column for sliding motion and connected to the head body so as to be rotated with the head body on the arm, a locking claw integrally projecting from the mirror plate, and a spring urging the mirror locking member along the arm in such a direction that the locking claw engages the mirror locking member, and wherein when the projection head assembly assumes the stowed position, the locking claw engages the mirror locking member such that the mirror is locked at a position where the angle of the mirror is maximum, and the mirror locking member is slid against a spring force of the spring so that the locking claw disengages from the mirror locking member such that the mirror is released from a locked state.

The column is preferably mounted on the housing so as to be pivotable between the standing position and the stowed position. The top of the housing provided with the stage is opened and closed. An interior of the housing includes a space in which the projection head assembly and the column are stowed. The projection head assembly and the column are stowed into the space when the projection head assembly is locked at the stowed position and the column is rotated to the stowed position.

BRIEF DESCRIPTION OF THE DRAWINGS

Other objects, features and advantages of the present invention will become clear upon reviewing the following description of the preferred embodiment, made with reference to the accompanying drawings, in which.

DETAILED DESCRIPTION OF THE PREFERRED EMBODIMENT

Figure 1:
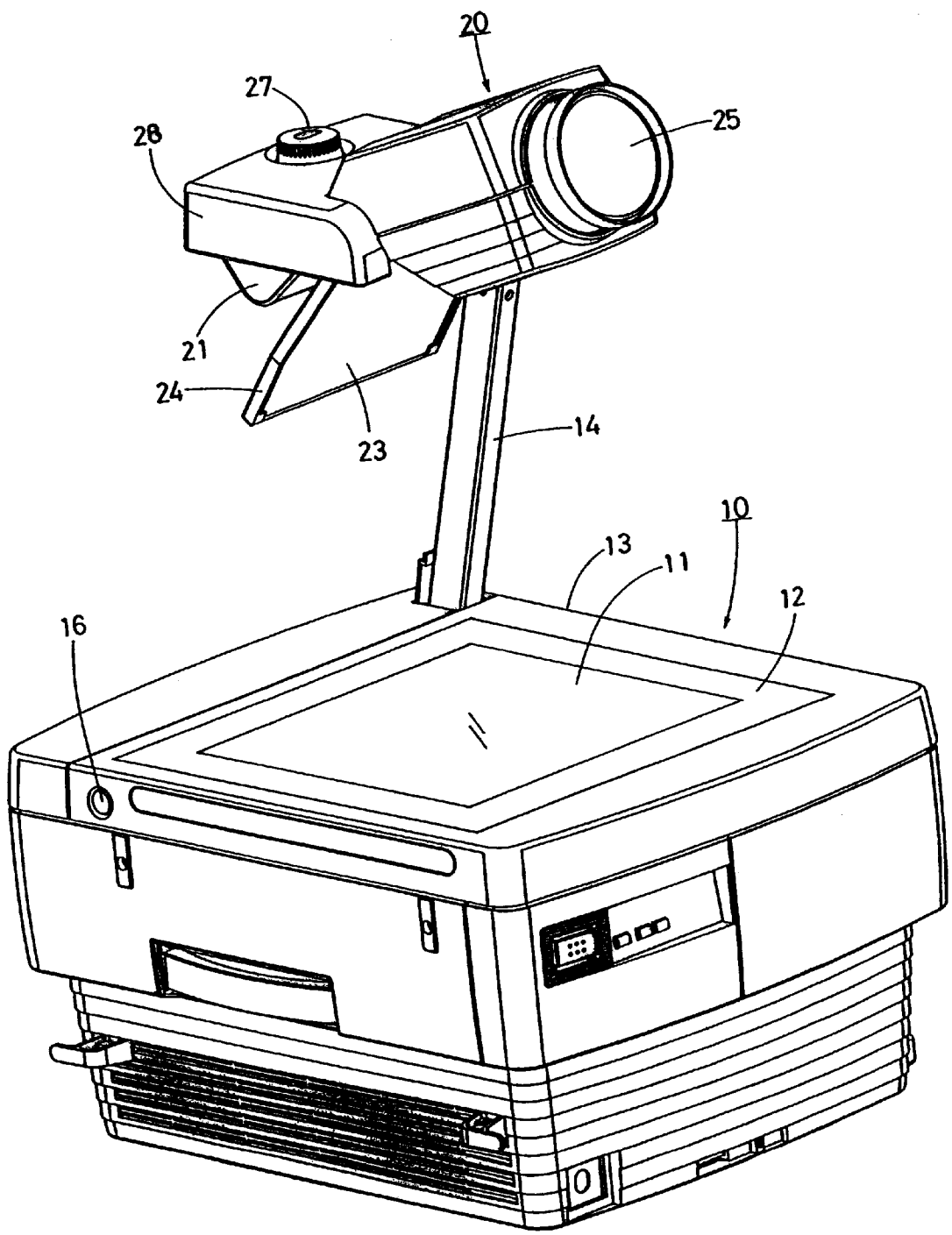
FIG. 1 is a perspective view of an overhead projector of one embodiment in accordance with the present invention.

One preferred embodiment of the present invention will be described with reference to the drawings. Referring to FIG. 1, the overhead projector of the under mirror type in accordance with the present invention is shown as designated by reference numeral 10. The overhead projector 10 comprises a housing 13 having a top formed with a stage 12 on which a transparency 11 bearing an image to be projected is placed. The housing 13 encloses a light source (not shown) for illuminating the transparency 11, a converging Fresnel lens, and a cooling fan, none of which are shown. The overhead projector 10 further comprises a mast or column 14 standing from one of corners of the housing 13 and a projection head assembly 20 supported on the column so that the head assembly is located over the stage 12.

Figure 11:
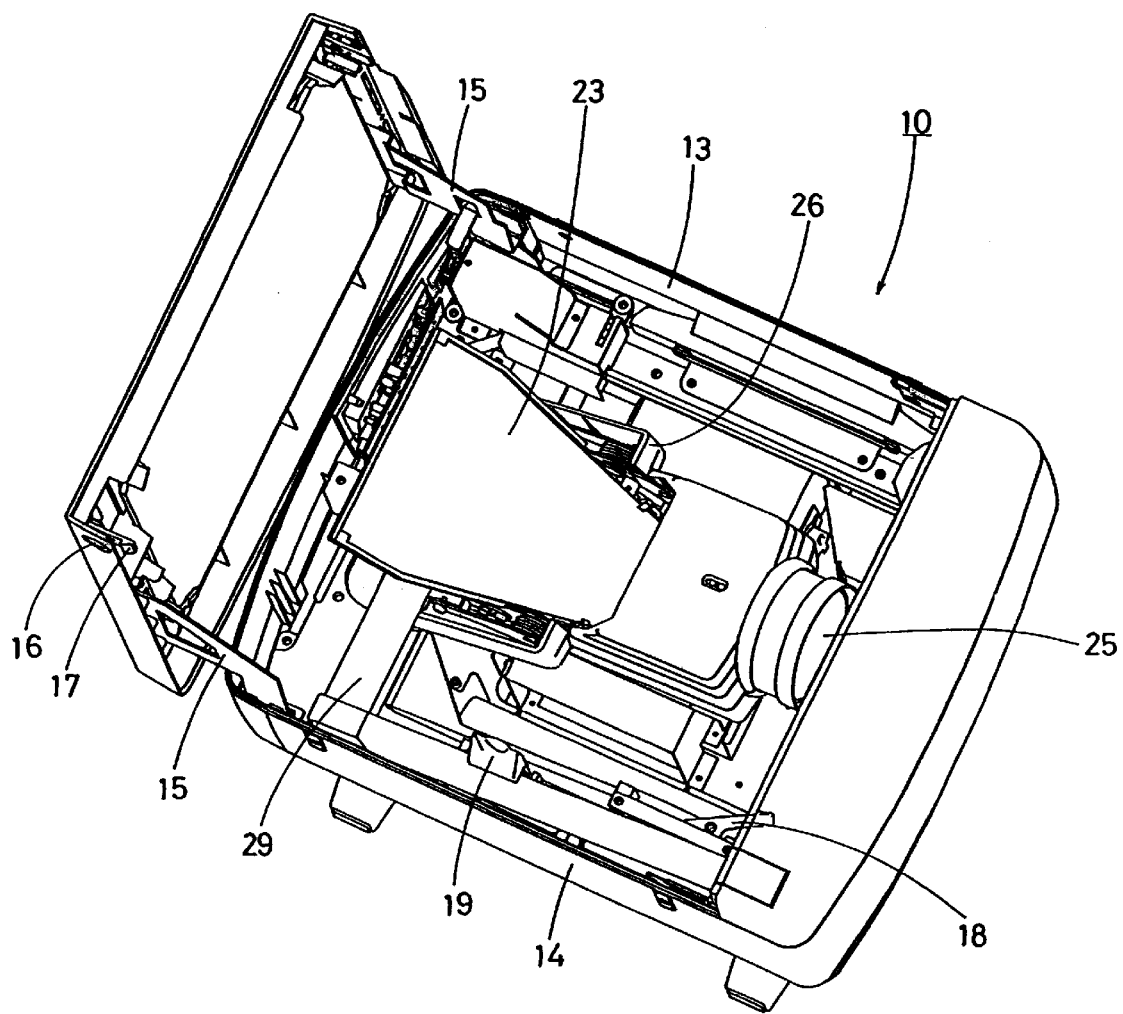
FIG. 11 is a perspective view showing the inside of the housing of the projector.

Two hinges 15 (see FIG. 11) are mounted on the body of the housing 13, and the top of the housing 13 is mounted on the hinges 15 so as to be opened and closed. An operating button 16 is mounted on a side wall of the housing 13 as shown in FIG. 1. A hook 17 (see FIG. 11) is mounted on an inside of the housing top. When the operating button 16 is depressed, the hook 17 is disengaged such that the housing top is opened as shown in FIG. 11. An interior of the housing 13 provides a space into which the projection head assembly 20 and the column 14 are folded to be stowed. The column 14 is mounted on the housing 13 so as to be pivotable between a standing position as shown in FIG. 1 and a stowed position where the column 14 is stowed in the housing 13 as shown in FIG. 11. A known locking mechanism (not shown) is provided on a root of the column 14 for locking the latter at the standing position.

The inner structure of the projection head assembly 20 will now be described with reference to FIGS. 2 and 3. The projection head assembly 20 comprises a head body including a head bracket 21 and a head frame 22, a mirror plate 24 supporting a reflecting mirror 23, a lens frame 26 supporting a projection lens 25 and a knobbed bolt 27 for angle adjustment. A head cover 28 is attached to the head frame 22 as shown in FIG. 1. The head bracket 21 is rotatably mounted on an arm 29 fixed to an upper end of the column 14, and the head frame 22 is secured to the head bracket 21, as will be described in detail later.

Figure 2:
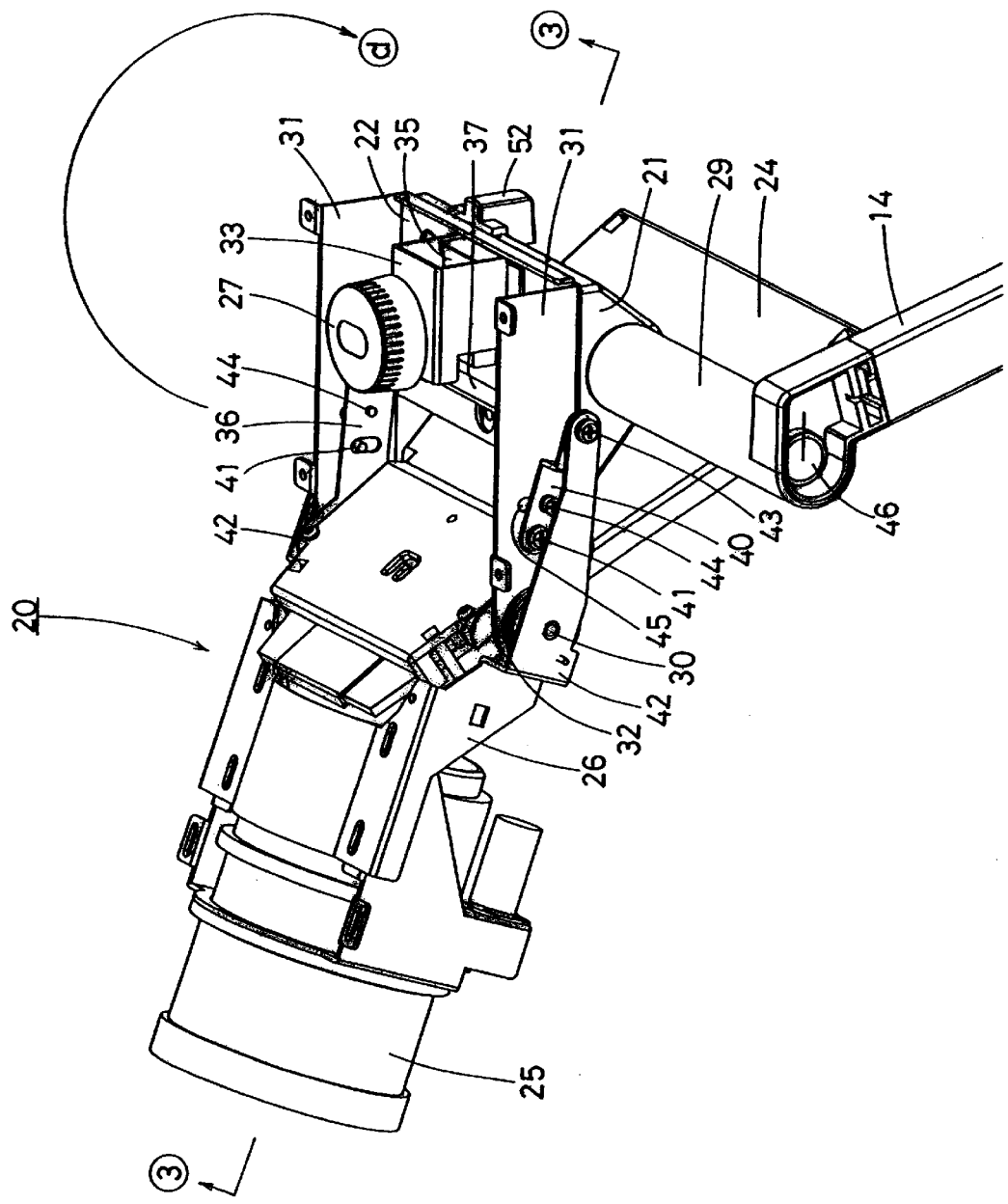
FIG. 2 is a perspective view of a projection head assembly with a head cover being removed.
Figure 3:
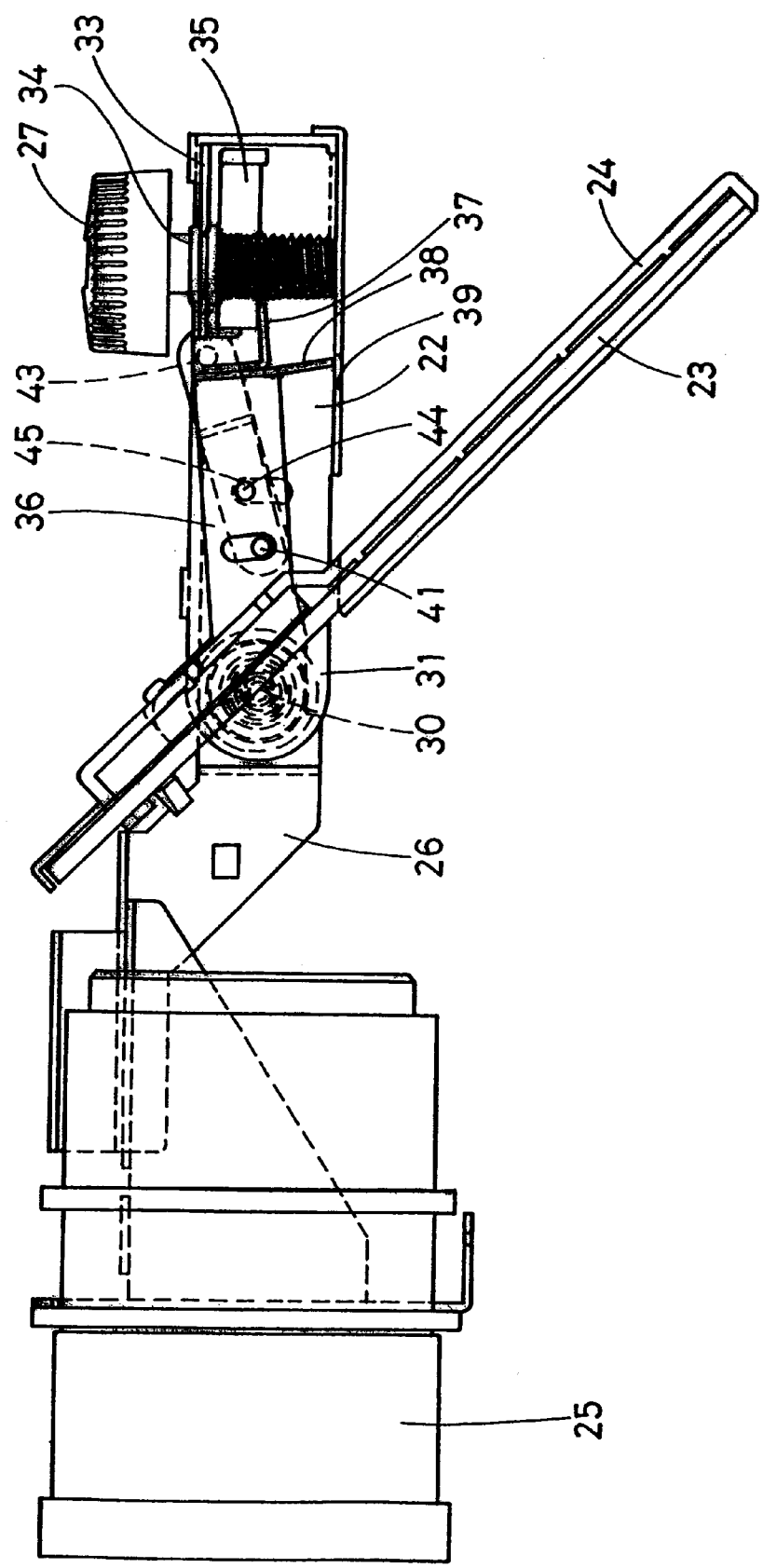
FIG. 3 is a partially broken side view of the projection head assembly.

Further referring to FIGS. 2 and 3, a pair of shafts 30 are mounted on the head frame 22. Both of the mirror plate 24 and the lens frame 26 are rotatably mounted on the shafts 30 so that angles of the projection lens 25 and the mirror 23 are adjusted. The lens frame 26 is subjected to a weight of the projection lens 25 to thereby be moved in such a direction that the angle of the lens is decreased, namely, counterclockwise in FIG. 3. The shafts 30 are fixed to side plates 31 of the head frame 22 respectively. A coil spring 32 is provided about each of the shafts 30 for urging the lens frame 26 in such a direction that the angle of the projection lens 25 is increased. The coil spring 32 prevents rapid rotation of the lens frame 26 due to the weight of the projection lens 25.

A generally C-shaped frame 33 is secured to the rear of the head frame 22. The frame 33 has a hole (not shown) formed through the top thereof as shown in FIG. 3. An angle adjusting knobbed bolt 27 is loosely inserted through the hole so as to be turnable. The knobbed bolt 27 includes a ring 34 formed integrally with a threaded portion thereof. The ring 34 prevents the knobbed bolt 27 from being moved back and forth, thereby preventing it from falling off. An angle adjusting piece 35 is provided in the frame 33 so as to be non-rotatable. The angle adjusting piece 35 is engaged with the threaded portion of the knobbed bolt 27 so as to be movable back and forth.

The mirror plate 24 includes a pair of levers 36 formed integrally therewith. A connecting piece 37 interconnects distal ends of the levers 36. The connecting piece 37 confronts the bottom of the angle adjusting piece 35. The connecting piece 37 engages the angle adjusting piece 35 when the mirror plate 24 is pivoted about the shafts 30 counterclockwise, namely, in such a direction that the angle of the mirror 25 is decreased. When the mirror plate 24 is pivoted clockwise, namely, in such a direction that the angle of the mirror 25 is increased, the connecting piece 37 disengages from the angle adjusting piece 35. The connecting piece 37 has a locking claw 38 formed on a middle portion thereof as shown in FIG. 3. The head frame 22 has a hole 39 formed through the bottom thereof. The locking claw 38 is moved through the hole 39.

The side plates 31 of the head frame 22 are provided with two link levers 40 respectively. Each link lever 40 has one end rotatably mounted on a shaft pin 41 further mounted on the respective side plate 31 of the head frame 22. Two levers 42 are formed integrally with the lens frame 26. The other end of each link lever 40 is rotatably connected by a stepped screw 43 with a distal end of the respective lever 42. Each link lever 40 has a middle portion rotatably connected by a stepped screw 44 with the respective lever 36 of the mirror plate 24. Each side plate 31 of the head frame 22 has an elongate hole in which the respective stepped screw 44 is loosely fitted.

Figure 4:
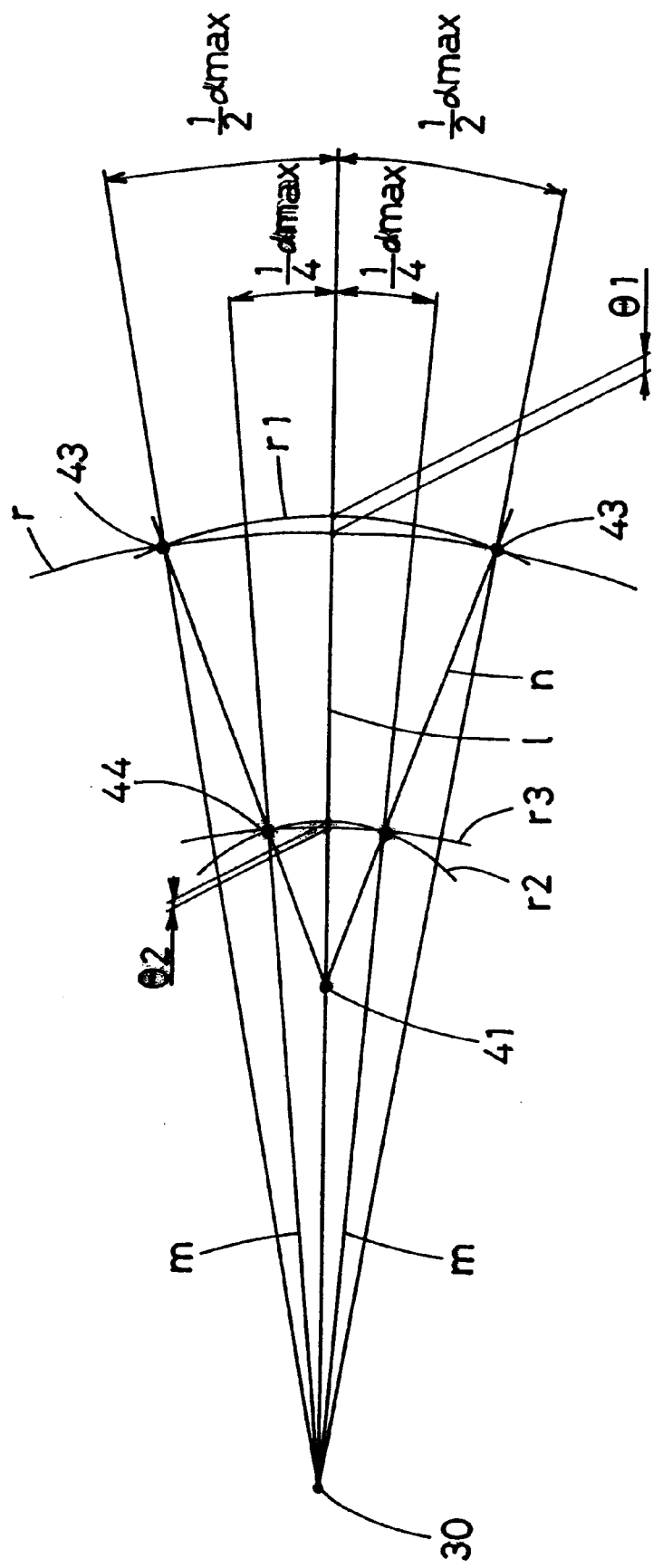
FIG. 4 is a diagram showing an arrangement of a shaft, shaft pin and stepped screw provided on the projection head assembly.

FIG. 4 diagrammatically shows positional relations among the shafts 30, the shaft pin 41 and the stepped screws 43 and 44. Arc r is a locus of the stepped screw 43 turned about the shafts 30. Arc r1 is a locus of the stepped screw 43 turned about the shaft pin 41. Arc r2 is a locus of the stepped screw 44 turned about the shaft pin 41. Arc r3 is a locus of the stepped screw 44 turned about the shafts 30. Reference symbol $\alpha$max designates a maximum angle of the projection lens 25. A distance between each shaft 30 and the stepped screw 43 and the maximum angle of the projection lens 25 are set. The location of the shaft pin 41 is set on a suitable point on a line 1 equally dividing the maximum angle $\alpha$max into two parts. Then obtained are the points of intersection of lines m equally dividing the maximum angle $\alpha$max into four parts together with line 1 and line n connecting the shaft pin 41 with the stepped screw 43. These points of intersection refer to locations of the stepped screws 44 respectively.

Since loci r and r1 differ from each other, each stepped screw 43 is fixed to the respective link lever 40 so as to stand therefrom, and an elongate hole is formed in each lever 42 so that a difference $\theta$1 between loci r and r1 is resolved. Each stepped screw 43 is loosely inserted through the respective elongate hole. Further, since loci r2 and r3 differ from each other, each stepped screw 44 is fixed to the respective lever 36 so as to stand therefrom, and an elongate hole is formed in each link lever 40 so that a difference $\theta$2 between loci r2 and r3 is absorbed. Each stepped screw 44 is loosely inserted through the respective elongate hole. When the shafts 30, the stepped screws 43 and 44 are arranged as described above, the angle of the projection lens 25 doubles the angle of the mirror 23.

Figure 5:
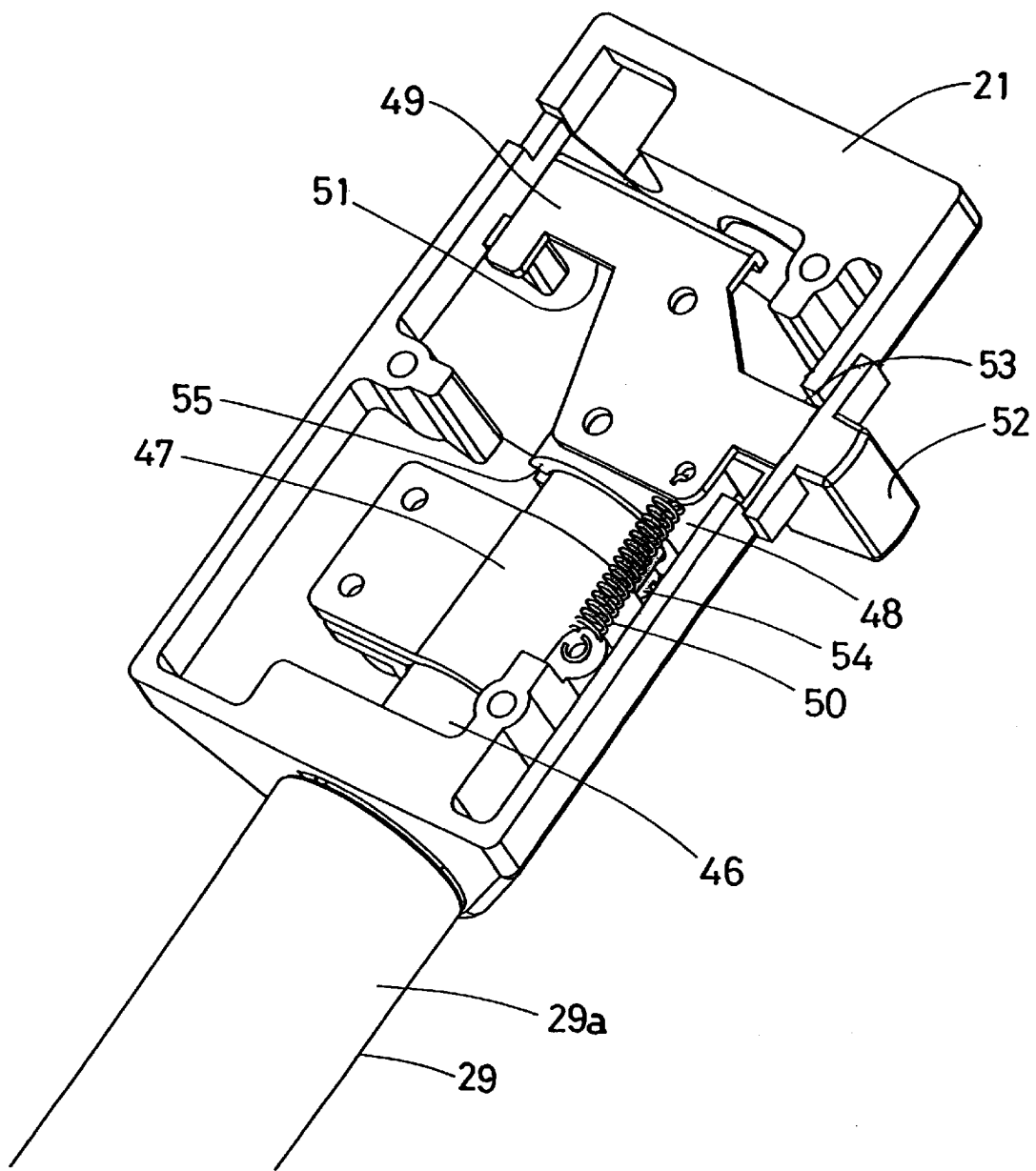
FIG. 5 is a perspective view showing the inner structure of a head bracket.
Figure 6:
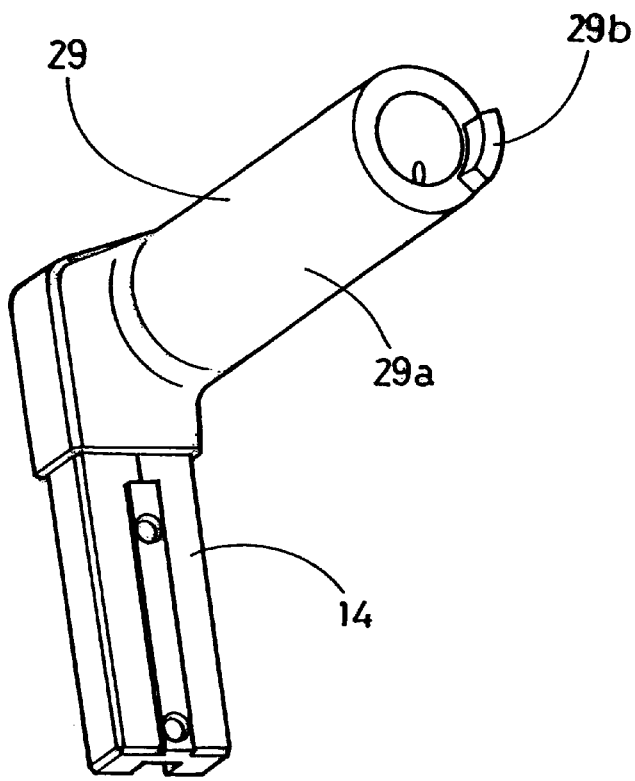
FIG. 6 is a perspective view of a proximal end of an arm.
Figure 7:
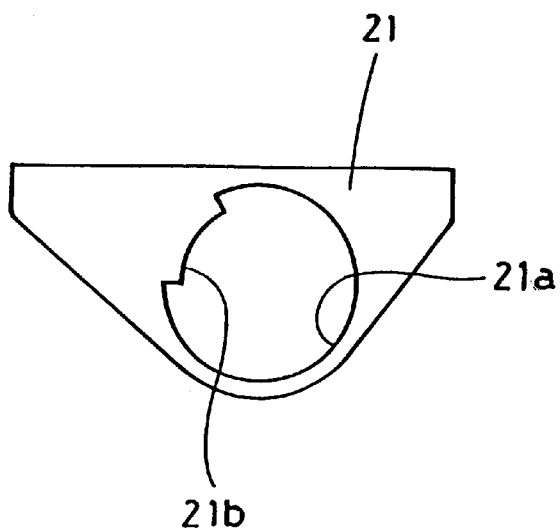
FIG. 7 is a side view of the head bracket of the projection head assembly.
Figure 9:
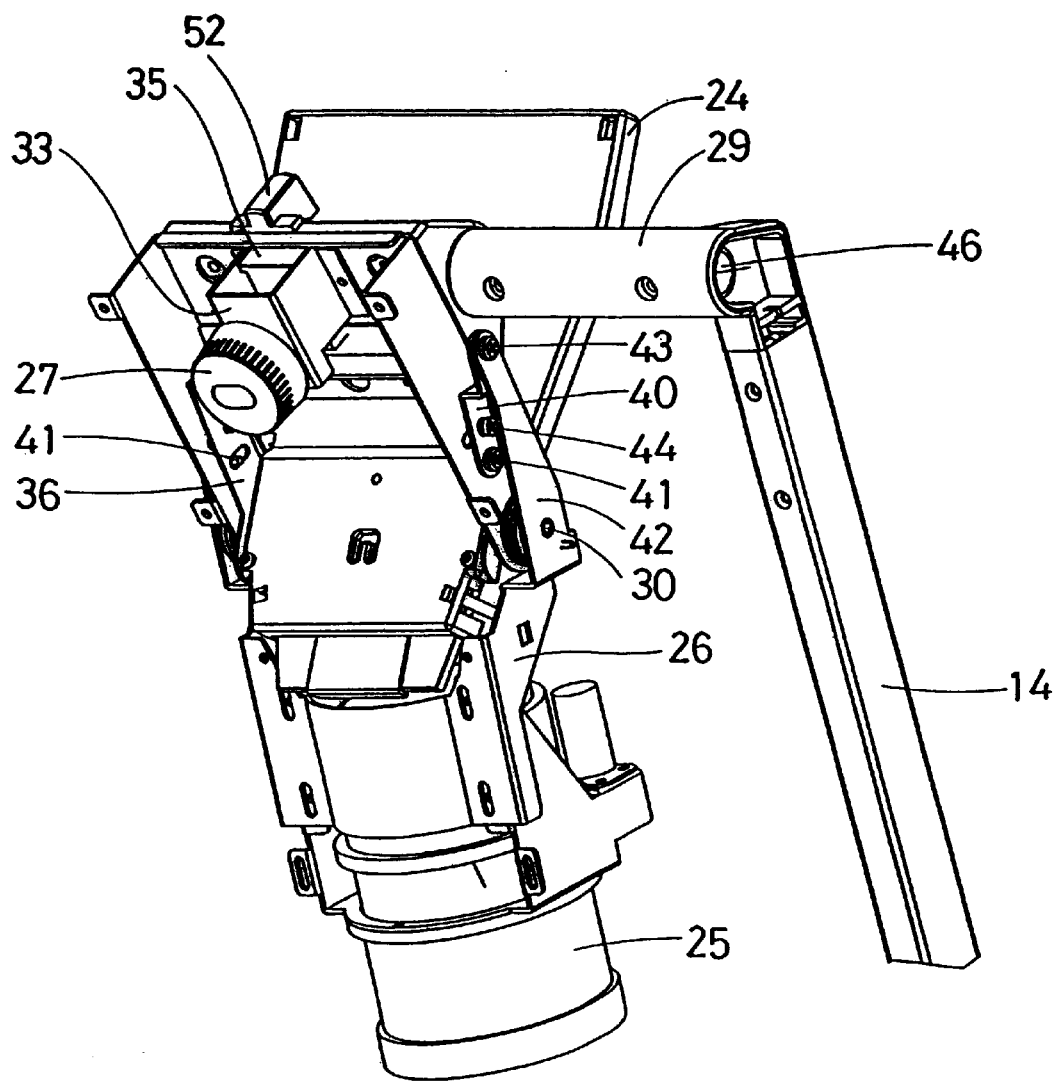
FIG. 9 is a perspective view of the projection head assembly with the head cover being removed.
Figure 10:
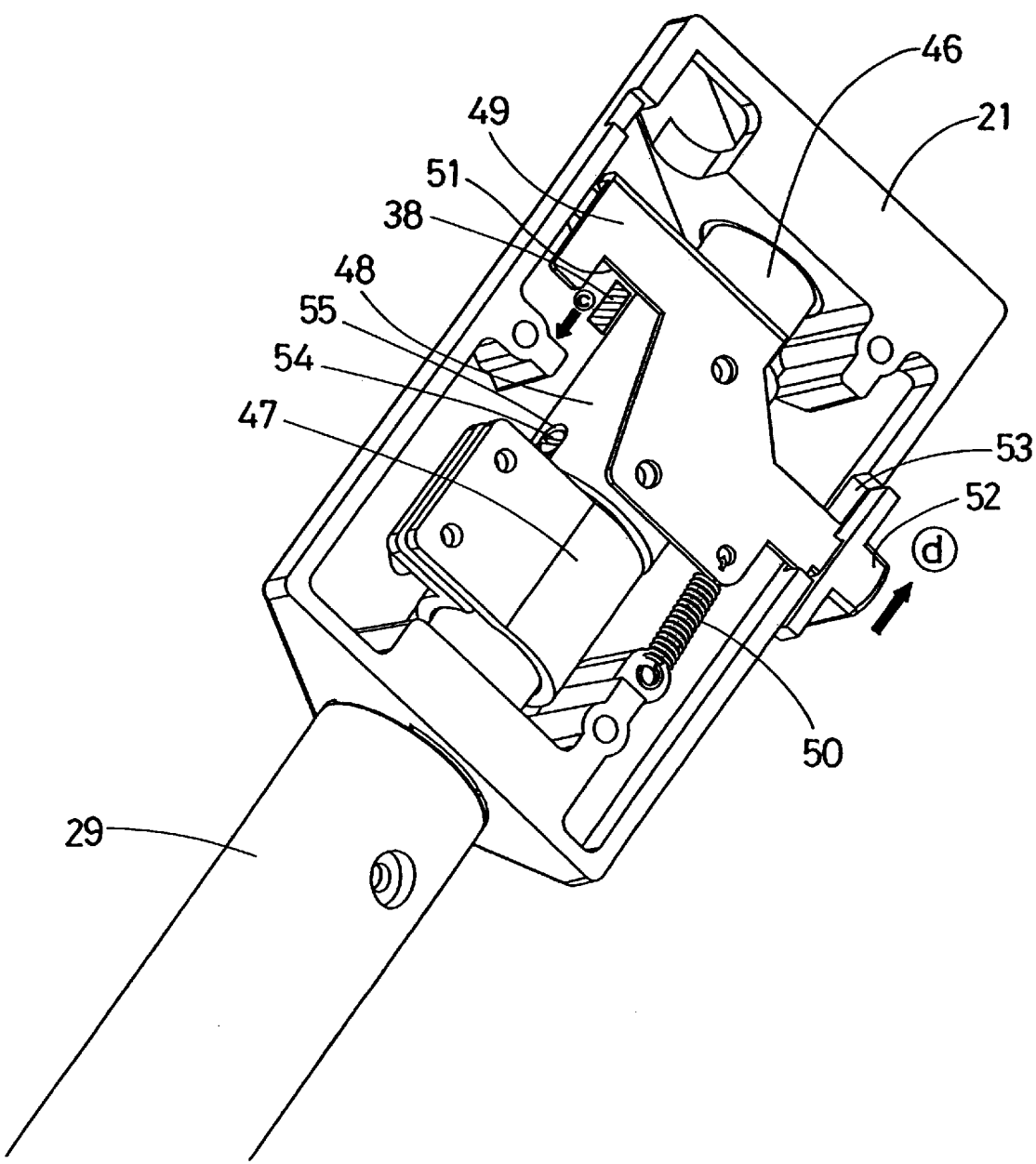
FIG. 10 is a perspective view of the head bracket of the projection head assembly.

Referring now to FIG. 5, the inner structure of the head bracket 21 is shown. The arm 29 is secured to the distal end of the column 14. The arm 29 includes a hollow proximal end 29a and a reduced diameter portion 46 fitted into an open distal end of the proximal end 29a. The arm 29 has a protrusion 29b formed on the distal end of the proximal end 29a as shown in FIG. 6. The head bracket 21 has a circular opening 21a formed with a sectorial protrusion 21b on the inner circumferential end thereof. The reduced diameter portion 46 of the arm 29 is inserted through the opening 21a such that the head bracket 21 is rotatably mounted on the arm 29. The sectorial protrusion 21b abuts against the protrusion 29b of the arm 29 so that the head bracket 21 is positioned at two locations. The projection head assembly 20 stands as shown in FIG. 1 when the head bracket 21 is positioned at one of the locations. On the other hand, when the head bracket 21 is positioned at the other location, the projection head assembly 20 is stowed as shown in FIG. 9.

A braking member 47 is provided in the reduced diameter portion 46 of the arm 29 for limiting rapid rotation of the head bracket 21. A generally cylindrical first locking member or head locking member 48 is fitted in the reduced diameter portion 46 so as to be slidable along the inner circumference of the latter and so as to be rotatable relative to the latter. A plate-like second locking member or mirror locking member 49 is screwed to the first locking member 48. A coil spring 50 is provided for urging the second locking member 49 along the reduced diameter portion 46. The second locking member 49 has an engagement recess 51 formed in an inner end thereof. The locking claw 38 of the connecting piece 37 engages the recess 51. A slide knob 52 is mounted on the outer end of the second locking member 49.

Referring further to FIG. 5, the head bracket 21 has a notch 53 formed in one side wall thereof. The outer end of the second locking member 49 extends through the notch 53 so as to be slidable axially with respect to the reduced diameter portion 46. Since the inner and outer ends of the second locking member 49 abut against the head bracket 21, the first and second locking members 48 and 49 and the head bracket 21 are simultaneously rotated about the reduced diameter portion 46. A locking pin 54 protrudes from the reduced diameter portion 46. The first locking member 48 has an engagement recess 55 formed in an end face thereof. The locking pin 54 engages the recess 55. The locking pin 54 is disengaged from the recess 55 in the state as shown in FIG. 5. However, when the first locking member 48 is rotated about the reduced diameter portion 46 with rotation of the head bracket 21 such that the recess 55 assumes a position where it is opposed to the locking pin 54, a spring force of the coil spring 50 causes the first locking member 48 to slide toward the braking member 47 so that the locking pin 54 engages the recess 55, whereupon the head bracket 21 is locked so as to be non-rotatable. Further, the locking claw 38 engages the recess 51 when the locking pin 54 engages the recess 55 as will be described later.

The operation of the overhead projector 10 will now be described. The column 14 is caused to stand up, and the projection lens 25 is directed to a screen (not shown). The light source is turned on to direct light to the transparency 11 placed on the stage 12. The light passing through the transparency 11 is reflected on the mirror 23 and caused to pass through the projection lens 25, so that an enlarged image is focused on the screen.

Figure 8:
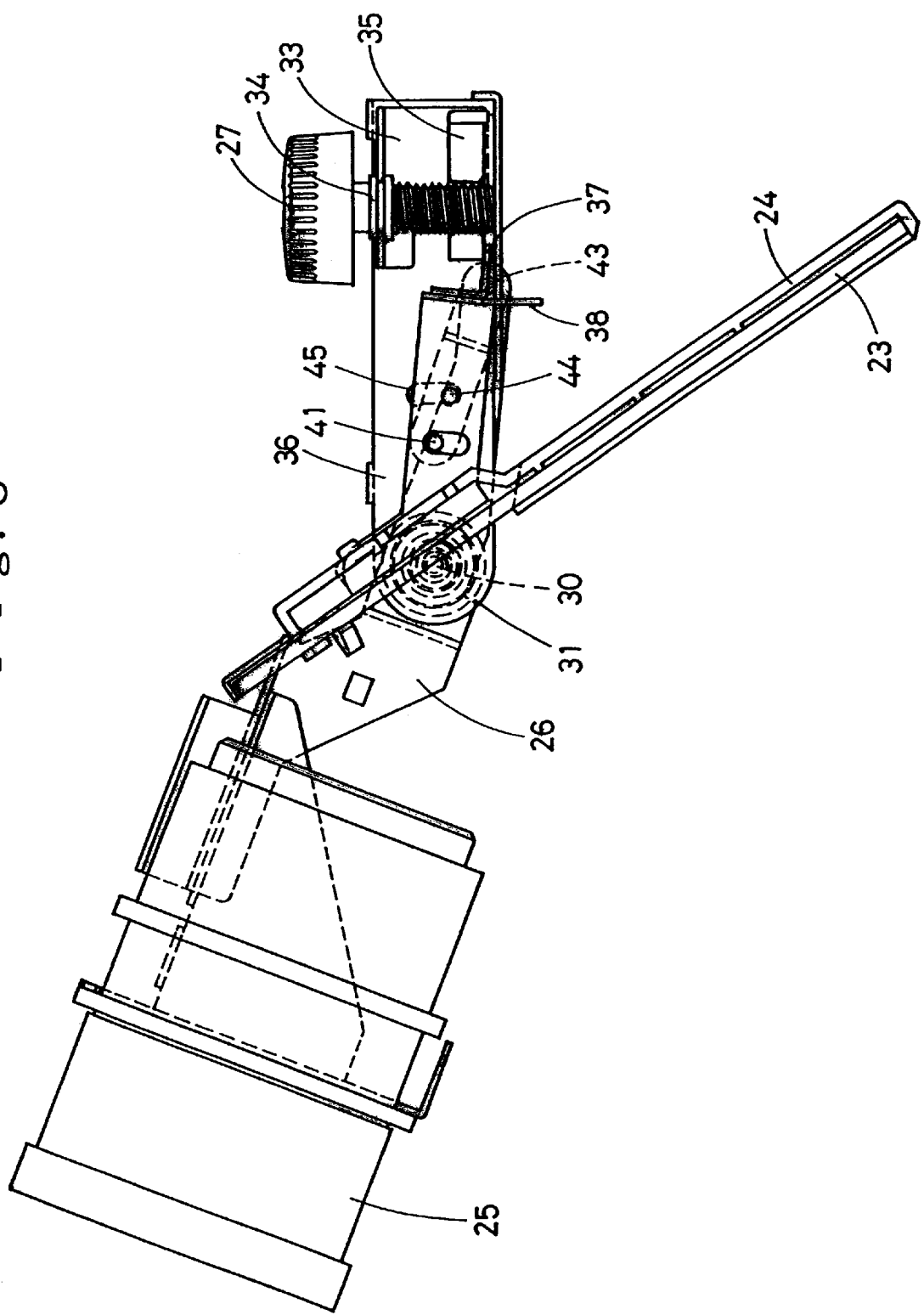
FIG. 8 is a partially broken side view of the projection head assembly.

For the purpose of adjustment of the angles of the projection lens 25 and the mirror 23, the angle adjusting knobbed bolt 27 is turned so that the angle adjusting piece 35 is moved along the bolt between an uppermost position as shown in FIG. 3 and a lowermost position as shown in FIG. 8. The weight of the lens 25 urges the lens frame 26 so that the latter is rotated counterclockwise. The mirror plate 24 connected by the link lever 40 with the lens frame 26 is also urged so as to be rotated counterclockwise, so that the connecting piece 37 interconnecting the levers 36 of the mirror plate 24 presses the angle adjusting piece 35. As a result, the mirror plate 24 is rotated about the shafts 30 in synchronization with the forward or backward movement of the angle adjusting piece 35, whereby the angle of the mirror 23 is adjusted. With rotation of the mirror plate 24, the link lever 40 connected to the lever 36 is rotated about the shaft pin 41 and accordingly, the lever 42 and the lens frame 26 are also rotated about the shafts 30 such that the angle of the projection lens 25 doubles that of the mirror When the overhead projector 10 is not in use, the projection head assembly 20 and the column 14 are folded to be stowed in the housing 13. For this purpose, the button 16 provided on the side wall of the housing 13 as shown in FIG. 11 is depressed so that the hook 17 is released, and the top of the housing 13 is opened. The projection head assembly 20 is then pivoted clockwise about the reduced diameter portion 46 of the arm 29 as shown by arrow d in FIG. 2 so that the projection lens 25 hangs down on the arm 29 as shown in FIG. 9. The first locking member 48 is turned upon pivoting of the head 20 such that the recess 55 of the first locking member 48 is opposed to the locking pin 54. Then, the spring force of the coil spring 50 slides the first locking member 48 along the reduced diameter portion 46 such that the locking pin 54 engages the recess 55, thereby locking the projection head assembly 20 at the stowed position. Simultaneously, the weight of the projection lens 25 rotates the mirror 23 to the maximum angle position. The mirror plate 24 is rotated clockwise from the position shown in FIG. 3 at this time. With the rotation of the mirror plate 24, the connecting piece 37 is departed from the angle adjusting piece 35 so that the locking claw 38 protrudes through the hole 39 of the head frame 22, engaging the recess 51 of the second locking member 49. As a result, the mirror plate 24 is locked at the maximum angle position and the lens frame 26 connected with the former is also locked at the maximum angle position.

When the projection head assembly 20 is released from the locked state, the slide knob 52 is manipulated so that the first and second locking members 48 and 49 are slid against the spring force of the coil spring 54. As a result, the locking pin 54 disengages from the recess 55 such that the projection head assembly 20 is rendered pivotable. Furthermore, the locking claw 38 disengages from the recess 51 such that the mirror 23 and the projection lens 25 are rendered rotatable.

Figure 12:
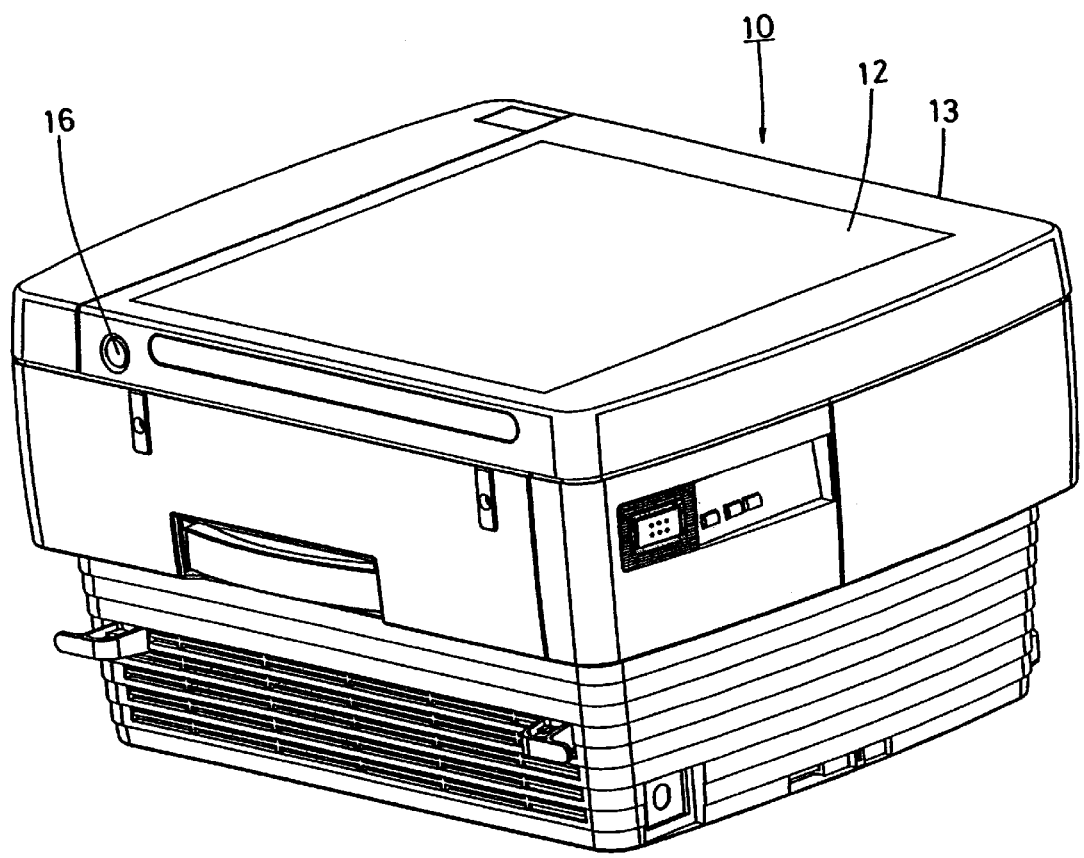
FIG. 12 is a perspective view of the overhead projector in its folded state.

The unlocking lever 18 provided on the base of the column 14 is manipulated after the projection head assembly 20 has been locked, so that the column locked at the standing position by a locking mechanism (not shown) is unlocked and stowed into the housing 13. When the column 14 is stowed away, the hook 19 springily engages the column 14 such that the latter is locked at the stowed position. The top of the housing 13 is then closed as shown in FIG. 12. When the hook 19 is pressed to disengage from the column 14 and the column 14 is raised up, it is automatically locked at the standing position by the locking mechanism.

According to the above-described overhead projector, the connecting piece 37 is departed from the angle adjusting piece 35 when the projection head assembly 20 is folded. Thus, the knobbed bolt 27 is not driven in synchronization with the projection lens 25. Accordingly, since the knobbed bolt 27 is prevented from protruding out of the projection head assembly 20, the latter can compactly be folded.

Further, when the projection head assembly 20 is pivoted to the stowed position, the coil spring 50 axially slides the first locking member 48 such that the locking pin 54 engages the recess 55, whereupon the head 20 is locked at the stowed position. The locking claw 38 simultaneously engages the recess 51 so that the mirror 23 and the projection lens 25 are locked at the maximum angle position. Consequently, both of the mirror 23 and the projection lens 25 can be prevented from rattling during carriage of the overhead projector 10.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. An overhead projector of the under mirror type comprising:

a housing including a stage formed on a top thereof so that a transparency bearing an image to be projected is placed on the stage;

a projection head assembly including a head body further including a reflecting mirror on which light passing through the transparency on the stage reflects and a projection lens focusing the light incident thereon on a screen, the projection head assembly being supported on a column so as to be located over the stage and so as to be movable between a standing position and a stowed position;

a head positioning element which positions the projection head assembly at the standing position;

a head locking element which releasably locks the projection head assembly at the stowed position;

a lens frame on which the projection lens is fixed;

a mirror plate on which the reflecting mirror is fixed, both the lens frame and the mirror plate being rotatably mounted on a single shaft further mounted on the head body of the projection head assembly so that angles of the lens and the mirror are increased and decreased, the lens frame being rotated by a self-weight of the lens in such a direction that the angle of the lens is decreased, when the projection head assembly assumes the standing position;

a link lever interconnecting the lens frame and the mirror plate so that the angles of the projection lens and the mirror are adjusted so that the angle of the lens doubles the angle of the mirror;

a mirror locking element which releasably locks the mirror at a position where the angle of the mirror is maximum;

an angle adjusting knobbed bolt mounted on the head body so as to be turnable and immovable back and forth;

an angle adjusting piece screwed on the knobbed bolt so as to be unturnable and movable back and forth, the mirror plate having an end departed from the angle adjusting piece when the mirror plate is rotated in such a direction that the angle of the mirror is increased, the end of the mirror plate engaging the angle adjusting piece when the mirror frame is rotated in such a direction that the angle of the mirror is decreased.

2. The overhead projector according to claim 1, wherein the head locking element includes a locking pin protruding from an arm fixed to the column, a head locking member slidably fitted with the arm and having on an end face thereof an engagement recess, and a spring urging the head locking member along the arm so that an end face of the head locking member abuts against the locking pin, and wherein the locking pin engages the recess such that the projection head assembly is locked at the stowed position and the locking element is slid against a spring force of the spring so that the locking pin disengages from the recess such that the projection head assembly is released from a locked state.

3. The overhead projector according to claim 1, wherein the mirror locking element includes a mirror locking member mounted on an arm fixed on the column for sliding motion and connected to the head body so as to be rotated with the head body on the arm, a locking claw integrally projecting from the mirror plate, and a spring urging the mirror locking member along the arm in such a direction that the locking claw engages the mirror locking member, and wherein when the projection head assembly assumes the stowed position, the locking claw engages the mirror locking member such that the mirror is locked at a position where the angle of the mirror is maximum, and the mirror locking member is slid against a spring force of the spring so that the locking claw disengages from the mirror locking member such that the mirror is released from a locked state.

4. The overhead projector according to claim 1, wherein the column is mounted on the housing so as to be pivotable between the standing position and the stowed position, wherein the top of the housing provided with the stage is opened and closed, wherein an interior of the housing includes a space in which the projection head assembly and the column are stowed, the projection head assembly and the column being stowed into the space when the projection head assembly is locked at the stowed position and the column is rotated to the stowed position.

* * * * *